(12) United States Patent
Zafrir

(10) Patent No.: US 8,396,790 B2
(45) Date of Patent: Mar. 12, 2013

(54) SYSTEM AND METHOD FOR FINANCING COMMERCIAL TRANSACTIONS

(75) Inventor: Shay Zafrir, Burlingame, CA (US)

(73) Assignee: Efficient Finance Ltd., Tel Aviv (IL)

( * ) Notice: Subject to any disclaimer, the term of this patent is extended or adjusted under 35 U.S.C. 154(b) by 0 days.

(21) Appl. No.: 12/766,435

(22) Filed: Apr. 23, 2010

(65) Prior Publication Data

US 2011/0015974 A1      Jan. 20, 2011

Related U.S. Application Data

(63) Continuation-in-part of application No. 10/537,317, filed on Oct. 21, 2005, now abandoned.

(30) Foreign Application Priority Data

Dec. 4, 2002    (IL) .......................................... 153275

(51) Int. Cl.
*G06Q 40/00*    (2012.01)
(52) U.S. Cl. ............................... 705/38; 705/39; 705/40
(58) Field of Classification Search ...................... 705/38
See application file for complete search history.

(56) References Cited

U.S. PATENT DOCUMENTS

| 5,694,552 | A | | 12/1997 | Aharoni |
| 5,704,045 | A | | 12/1997 | King et al. |
| 5,732,400 | A | * | 3/1998 | Mandler et al. ............ 705/26.44 |
| 6,267,292 | B1 | * | 7/2001 | Walker et al. ................. 235/379 |
| 6,347,307 | B1 | | 2/2002 | Sandhu et al. |
| 6,535,856 | B1 | | 3/2003 | Tal |
| 6,636,833 | B1 | | 10/2003 | Flitcroft et al. |
| 2001/0027437 | A1 | | 10/2001 | Turbeville et al. |
| 2002/0082985 | A1 | * | 6/2002 | MacKay ........................ 705/39 |
| 2002/0089852 | A1 | * | 7/2002 | Casciani et al. .............. 362/290 |
| 2002/0095390 | A1 | | 7/2002 | Hovsepian |

FOREIGN PATENT DOCUMENTS

JP     2002-329068 A     11/2002

OTHER PUBLICATIONS

Czinkota, Michael; Export Promotion: A framework for finding opprtunity in change; Thunderbird International Business Review 44. 3 (May/Jun. 2002).*
Chbrow. Eric; Colkin, Eileen. Hidden value: Information Week 885 (Apr. 22, 2002):22-24.*
Ledbetter, Ashley: Zipkin, Ilan. Journal of Commercial Biotechnology 8. 4 (Spring 2012).*

* cited by examiner

*Primary Examiner* — Hani M Kazimi
*Assistant Examiner* — Hatem M Ali
(74) *Attorney, Agent, or Firm* — Sughrue Mion, PLLC

(57) ABSTRACT

A method for financing a commercial transaction between a supplier and a buyer, including engaging a buyer receiving goods or services under terms of trade credit from a supplier of goods or services, the trade credit permitting payment for the goods or services at a future date, the buyer neutralizing a trade risk associated with paying for the goods and services; engaging a financial institution to provide capital against a commitment of the buyer to effect the payment at a future date; transferring a portion of the capital to the supplier in advance of the future date, the portion satisfying consideration for the supply of the goods or services; and distributing to the buyer a fee lower than the difference between the capital and the portion.

49 Claims, 6 Drawing Sheets

SYSTEM AND METHOD FOR FINANCING COMMERCIAL TRANSACTIONS

This application is a Continuation-in-Part of U.S. application Ser. No. 10/537,317, filed Oct. 21, 2005, which claims the benefit of PCT/IL2003/001022, filed on Dec. 3, 2003, which claims the benefit of Israel Patent Application No. 153275 entitled "Method and System for Providing Collaborative Financing of Trade Credit" filed on Dec. 4, 2002. The disclosures of Israel Patent Application No. 153275 and U.S. application Ser. No. 10/537,317 are incorporated by reference in their entireties.

BACKGROUND OF THE INVENTION

1. Field of the Invention

The present invention generally relates to a method, and related system, for financing commercial transactions among buyers and suppliers and more particularly to a method and system for financing of trade credit in a manner that reduces the costs of purchasing goods and services under terms of trade credit.

2. Discussion of Related Art

Trade credit is widely used in commercial transactions for the purchase and sale of goods and services, both domestically and internationally. Under conventional terms of trade credit, a supplier supplies goods or services to a buyer, and the buyer agrees to pay for goods and services at some future date, after delivery of the goods or services.

Competition among suppliers typically compels suppliers to sell goods and services under terms of trade credit. However the provision of trade credit comes at a measurable financial cost. This cost is evidenced, for example, by suppliers being willing to offer purchasers a discount for early payment of the purchase price of a sale, or alternatively by suppliers obtaining short term financing from third parties, secured by an expectation to receive future payment in consideration of a trade transaction.

Although trade credit plays an important role in streamlining and enabling economical commercial relationships between suppliers and buyers, it may result in various economic inefficiencies. For example, although a buyer may be able to raise funds under better terms than a supplier, in a commercial relationship, a cash discount may not provide a sufficient incentive for a buyer to surrender credit terms offered by a supplier. As a result, the economic cost of a trade transaction may be higher than it needs to be.

Several methods have been proposed to improve commercial transactions:

U.S. Pat. No. 5,694,552 to Aharoni describes a financing method incorporating a new use of a financial instrument called a trade acceptance draft (TAD) as payment for goods and services. A TAD resembles a post-dated check and requires the cooperation of a supplier, buyer and financial institution. Against a buyer endorsed TAD, a seller may receive from a financial institution an advance of payment with respect to goods and services delivered. The TAD establishes an independent legal relationship between the buyer and the financial institution entitling the financial institution to deposit the TAD at a future due date for collection from the buyer.

U.S. Pat. No. 6,167,385 describes a supply chain financing system and method in which a buyer generates a purchase order, and a supplier ships goods against the purchase order and sends an invoice to the buyer which is stored in a database. A financial institution has direct access to invoices in the database and provides financing to the supplier for goods shipped under selected invoices. Upon maturity of the financing, the buyer settles with the financial institution.

U.S. patent application publication 2002/0082985 describes a method and system for converting existing or future trade credit obligations into a new obligation. Suppliers bargain or bid to provide purchasers a discount for the prompt payment of one or more accounts receivable with respect to a trade transaction. A funding company promptly pays the supplier an agreed discounted payment in satisfaction of an account receivable. At an agreed future date the purchaser pays the finance company an amount greater than the discounted payment, up to the face value of trade transaction.

U.S. patent application publication 2002/0116332 describes a system and method for facilitating a commercial transaction incorporating a new use of a post dated negotiable instrument in the amount of an invoiced value of a trade transaction.

Although these methods may be somewhat effective in securing trade credit or obtaining better credit terms, buyers still may not have a sufficiently adequate incentive to fully collaborate with suppliers to make available to suppliers improved terms of short term credit to which only the purchaser have access.

SUMMARY OF THE INVENTION

To solve the above described problem, the present invention seeks to provide an improved financing method which encourages collaboration between a supplier and a buyer so that superior terms of short term credit available to relatively strong buyers may be exploited when financing relatively weak suppliers, wherein relative strength is a measure of relative financial strength.

The present invention further seeks to encourage a buyer to collaborate with a financial facilitator in obtaining improved terms of short term trade credit while creating for the buyer a direct profit and other commercial benefits.

The present invention further seeks to create new credit possibilities available for a supplier, and to encourage collaboration of a buyer by creating additional income for the buyer.

The present invention further seeks to improve efficiencies in financing trade credit in cases where there is a "financial gap" between a buyer's cost of funds and the discount rate which a supplier is prepared to pay for exchanging the buyer's debt into immediately available cash.

In accordance with an embodiment of the invention, a suppliers' invoices which may be paid early are prioritized according to a "financial gap", commercial risks associated with a buyer's acceptance of goods and services are removed, funds for making early payment to the supplier are obtained from financial institutions competing to provide credit, and a buyer's preferences and other buyer related constraints are taken into consideration. A buyer is incentivized to collaborate in securing improved terms for financing trade credit by paying to the buyer an operational fee that is smaller than the difference between a discount for prompt payment offered by the supplier and cost of funds charged by financial institutions against the buyer's risk.

In accordance with another aspect of the present invention, a buyer's debts to a supplier are purchased from the supplier and then sold to a financial institution following the neutralization of the commercial risks of the debt by provision of an irrevocable commitment by the buyer to pay for delivered goods and services at a future date. The funds received from the financial institution are used to make an early payment to the supplier. A payment in amount smaller than the financial gap between the discount rate at which the supplier is willing to receive early payment, and the amount of cash that a financial institution is willing to immediately provide against the buyer's commitment to pay in the future is distributed to the buyer.

Participants in a trade credit financing transaction in accordance with an embodiment of the invention thus share in the benefits of increased economic efficiency: a supplier promptly receives cash in exchange for an account receivable, the cost of the cash is at an attractive price made possible by collaboration of the buyer and the buyer making an irrevocable commitment to pay for goods and services received; a buyer receives new income; and financial institutions cart gain new business by providing additional credit on the basis of a buyer's creditworthiness.

There is thus provided in accordance with an embodiment of the invention a method for paying in a commercial transaction between a supplier and a buyer including essentially neutralizing a trade risk associated with payment for a commercial transaction for the delivery goods or services from the supplier to the buyer, the commercial transaction including credit terms permitting payment for the goods or services at a future date; engaging a facilitator to obtain capital from one or more financial institutions against a commitment of the buyer to effect payment at a future date which is based on the buyer's existing legal liability to pay the supplier; paying a portion of the capital to the supplier in advance of the future date, the portion being the supplier's satisfaction for the commercial transaction; honoring the commitment to effect the payment on or about the future date; and distributing between the buyer and the facilitator a difference between capital obtained from the one or more financial institutions and the portion paid to the supplier.

There is thus provided in accordance with another embodiment of the invention, a method for financing a commercial transaction between a supplier and a buyer, including: engaging a buyer receiving goods or services under terms of trade credit from a supplier of goods or services, the trade credit permitting payment for the goods or services at a future date, the buyer neutralizing a trade risk associated with paying for the goods and services; engaging a financial institution to provide capital against a commitment of the buyer to effect the payment at a future date; transferring a portion of the capital to the supplier in advance of the future date, the portion satisfying consideration for the supply of the goods or services; and distributing to the buyer at least part of a difference between the capital and the portion as a fee for its service to the facilitator.

There is thus provided in accordance with still another embodiment of the invention, a method for financing of a trade credit, including: receiving and storing information from parties participating in a trade credit financing transaction; selecting according to the information received from the parties and the buyer's preference the debt to finance and the financial sources to use for financing the debt; presenting the selected debt and the corresponding accounts payable and the parties to the trade credit financing transaction to the buyer; approving by the buyer of the selected debt and the parties to the trade credit financing transaction and by sending an ante-dated irrevocable order to pay the debt; assigning the buyer's payment to a financial institution and receiving discounted cash in return; paying in cash to a supplier a payment approved by the buyer less a discount; and paying the buyer a fee which is lower than the difference between the cash received from the financial institution and the cash paid to the supplier.

There is thus provided in accordance with still another embodiment of the invention, within a computer device having at least one central processing device, at least one storage device, linked to a data communications network, an apparatus for financing of a trade credit by discounting a buyer's debt to the supplier and selling the buyer's debt to a financial institution, the apparatus including the elements of: an interface for interfacing with the buyer, supplier and the financial institution in order to provide information concerning the invoices and the terms of the trade credit financing transaction; a device for prioritizing or selecting at least one trade credit financing transaction and based on the terms of the at least one transaction for suggesting to at least one buyer at least one trade credit financing transaction; and a database storing information of the parties to the trade credit financing transaction preferences.

There is thus provided in accordance with still another embodiment of the invention, a method in which an entity for financing trade credit by discounting a buyer's debt to the supplier, eliminating commercial risks of the debt through collaboration with at least one buyer and selling the at least one buyer's debt to a financial institution, the method including the steps of: obtaining at least one supplier demand for a trade credit financing transaction; obtaining a credit line at least one financial institution has proposed to provide against the buyer; obtaining from at least one buyer at least one received and approved for payment invoice associated with the supplier; processing the at least one supplier demand, the credit line and the at least one received and approved for payment invoice associated with the supplier whereby at least one invoice is selected for payment; transmitting the at least one invoice selected for payment to the buyer; receiving at least one ante-dated irrevocable payment order to the at least one financial institution to pay the entity, on the at least one selected invoice for payment due date, the total of the face value of the at least one invoice selected for payment; receiving funds, for the assignment of the buyer's future payment, from one financial institution at a rate that represent the buyer's credit risk; transferring to the supplier a discounted payment for the at least one invoice selected for payment; and transferring to the buyer a payment lower than the difference between the funds received from the financial institution and the funds paid to the supplier.

BRIEF DESCRIPTION OF THE DRAWINGS

The present invention will be understood and appreciated more fully from the following detailed description of illustrative, non-limiting embodiments with reference to the accompanying drawings, in which.

DETAILED DESCRIPTION

Figure 1A:
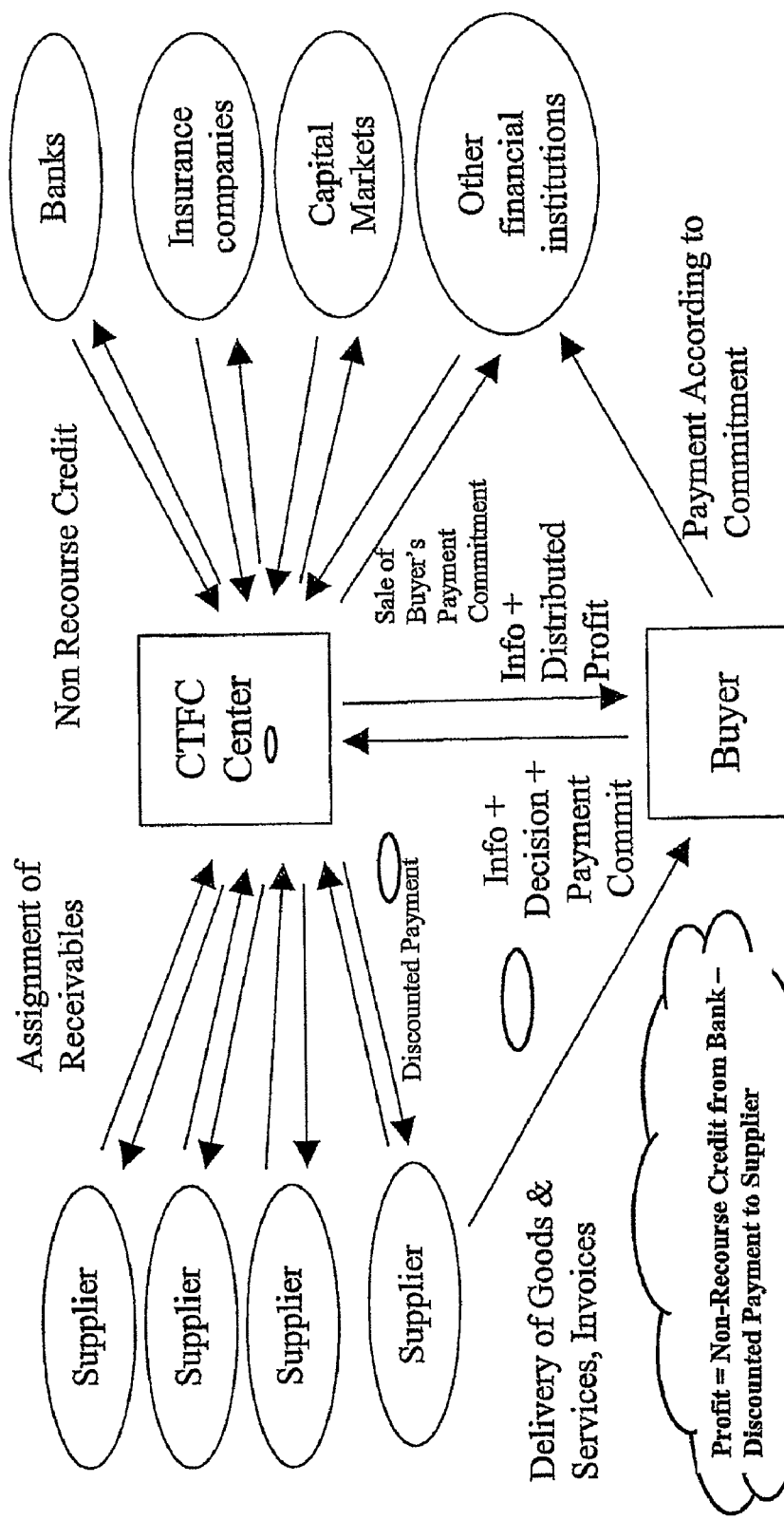
FIG. 1A is a simplified block diagram illustrating an interaction among participants in a method for collaborative financing of trade credit ("CFTC") in accordance with an embodiment of the invention.
Figure 1B:
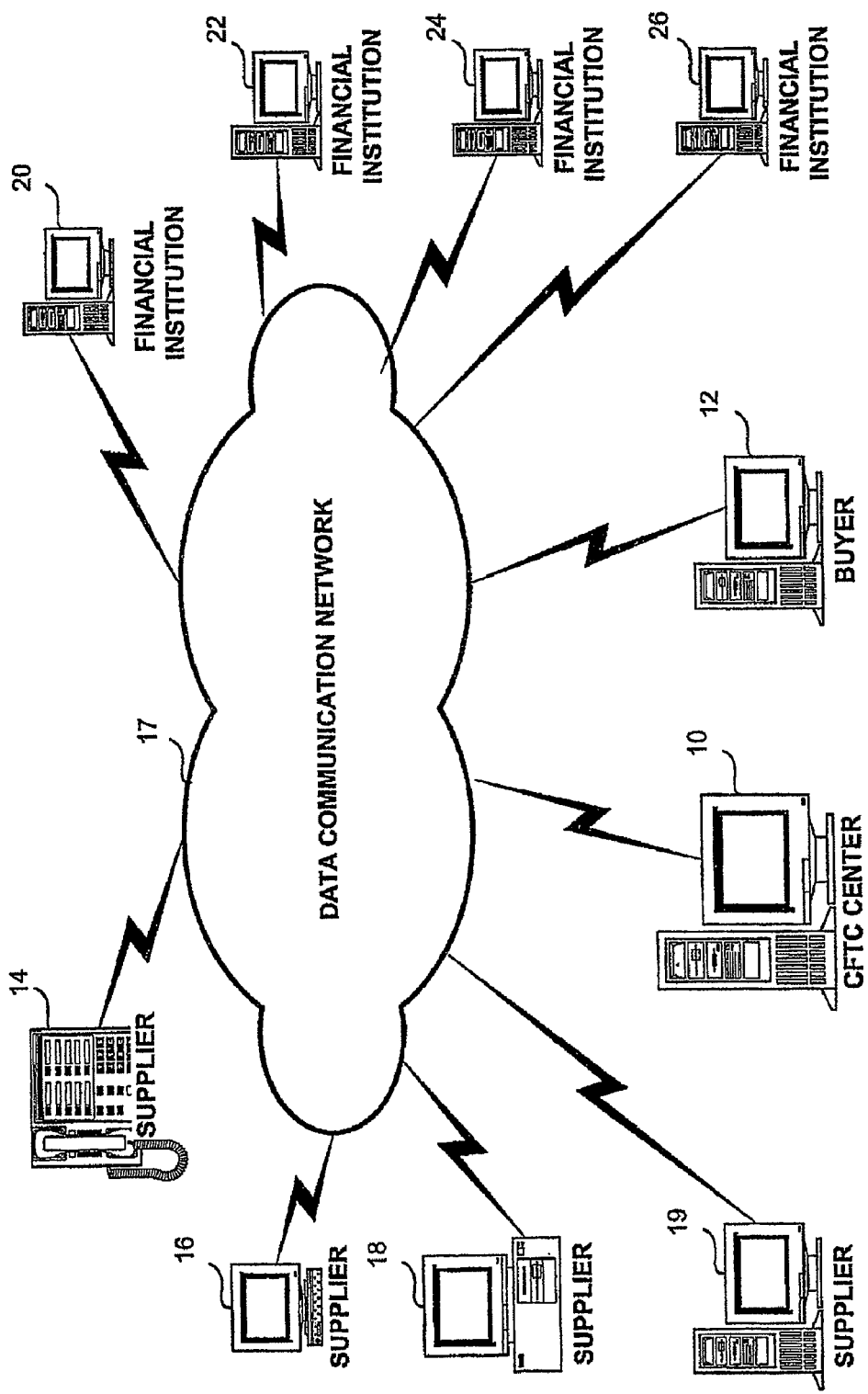
FIG. 1B is a schematic illustration of a computing and communications environment for implementing the method of FIG. 1A.

Reference is made to FIG. 1A which is a simplified block diagram illustrating an interaction among participants in a method 100 for collaborative financing of trade credit ("CFTC"), in accordance with an embodiment of the invention. The method, and a system for implementing the method as seen in FIG. 1B, is used to finance trade credit offered by a supplier to a buyer in a transaction for the sale of goods or services.

As seen in FIG. 1A, a supplier delivers goods or services to a buyer, and the buyer is invoiced for the sale under terms of trade credit requiring payment of a purchase price at some future date. In accordance with an embodiment of the invention, a supplier who desires to finance trade credit offered to the buyer enters into an arrangement with a center for the collaborative financing of trade credit. In accordance with this arrangement, the supplier agrees to assign to the CFTC Center its right to accounts receivable from the buyer, and in consideration it receives from the CFTC the sales price less a discount for prompt payment.

The CFTC enter obtains capital for payment of the discounted sales price to the supplier from one or more financial sources. These include, for example, one or more of banks, insurance companies, capital markets or other financial institutions. In accordance with an embodiment of the invention, this capital is the form of non-recourse credit/payment issued against the sale of a buyer's irrevocable commitment to pay up, at an agreed future date, the purchase price of goods or services that it received from the supplier.

The CFTC center thus facilitates the obtaining of short term financing for the supplier's trade credit. Consideration for the CFTC's services is derived from the financial spread between non-recourse credit/payment that a financial institution is willing to pay in consideration of its receiving a commitment from the buyer to pay the purchase price and the discounted purchase price that a supplier is willing to accept for early payment of the purchase price.

It is appreciated that as this spread increases, the potential for profit of the CFTC center also increases. It is a feature of embodiments of the present invention that various mechanisms are provided to increase this financial spread. These mechanisms may include, for example and without limitation, one or more of the following: (i) suppliers compete for the obtaining for a prompt payment discount. A criterion for selecting a supplier may be, for example, a supplier's willingness to accept a sizable discount for prompt payment; (ii) banks and financial institutions compete to provide non-recourse credit under the most preferential terms for a given commitment of a buyer to pay the purchase price at a future date; (iii) buyers are encouraged to quickly approve invoices for goods and services received in uncontested transactions. Irrevocable approval of invoices neutralizes trade risks, and quick approval of invoices increases the time for which suppliers obtain short term financing of trade credit; (iv) buyers share information about goods and services received, and invoices approved; and (v) a portion of the gap between non-recourse credit/payment from a financial institution and the discounted purchase price that a supplier is willing to accept is distributed to the buyer to encourage the buyer's collaboration in securing superior terms of trade credit.

The inventors believe that a collaborative financing method in accordance with an embodiment of the present invention improves economic efficiency in commercial relationships where at least one financial institution offers financing against the buyers' credit risk at a cost of funds that is lower than the discount rate at which the supplier is ready to pay for exchanging the buyer's debt into cash. Thus, in accordance with an embodiment of the invention, a supplier may finance trade credit at terms which are better than it would be able to obtain, but for collaboration of the buyer.

In accordance with an embodiment of the present invention, a specifically designed, developed and implemented CFTC service center establishes commercial relations with buyers. These buyers typically are financially strong corporations, with respect to whom financial institutions are willing and able to take a credit exposure at a relatively low interest rate, compared to interest rates available in financial markets.

As seen in FIG. 1A, the CFTC service center receives periodically, but not necessarily synchronously with a given trade transaction or at the same intervals as trade transactions, functional information from one or more of the following sources: a) information from suppliers, or agreements with suppliers representing discount demands, namely the price that suppliers are prepared to accept a prompt cash payment in exchange for an account receivable with respect to money that a buyer owes for merchandise, services, or for other reasons, b) information from a plurality of financial institutions relating to how much of a buyers' debt, clean from any commercial dispute, they are prepared to buy and at what price, and c) near in time to each transaction, information on approved-for-payment invoices from the buyers. In accordance with an embodiment of the invention, information on approved for payment invoices is obtained directly from an accounts payable (AP) system of a cooperating buyer.

The CFTC service center processes the collected information and determines one or more of the following: which suppliers should be included in the process; which invoices should be included in the process, which financial institutions should be included in the process; and what amount of debt should be financed. As noted above, the processing is performed in order to increase the financial spread in the transaction. Optionally, processing by the CFTC service center may consider specifically pre-defined strategic criteria and other preferences of the buyers, terms set by the suppliers and the availability of financial resources.

In accordance with an embodiment of the invention, processed information is presented to buyers in the form of suggestions for financing transactions. These may include, for example, particular invoices, the financial institutions available to provide financing and the amount of funds available. Buyers optionally have the power modify transactions suggested by the CFTC center. Once a buyer approves a transaction, it sends a post-dated, irrevocable, assignable payment commitment or payment order. This commitment may be sent directly to a financial institution, or via the CFTC center.

One aspect of a payment order is a payment request or instruction from a buyer to a financial institution to pay a certain amount of money to a certain account, for example to the supplier, on a certain date. Another aspect of the payment order is that it includes a firm commitment by the buyer to pay to the CFTC service center (instead of directly to the supplier) the full face value of selected invoices received from selected suppliers on or before a future payment date. The payment commitment is always against the accounts receivable that the CFTC buys or pays to the suppliers and therefore any assignment of the payment order means assignment of the accounts receivable that the payment order covers.

The CFTC service center assigns a buyer's payment commitment to a selected financial institution. The CFTC service center receives from the financial institution either cash, short-term loan or a combination of the two against the assigned commitments. Financing received from the financial institutions carries an interest rate that reflects the buyer's cost of funds at the financial institution. The CFTC service center subsequently pays a supplier in cash (less the discount for early payment of a sales transaction). The CFTC reports to the suppliers which invoices have been settled by the payment and which invoices are assigned to the CFTC.

An amount lower than the spread between the cash received from the financial institution and cash paid to the supplier is distributed to the buyer by the CFTC for the buyer's services. The remaining portion stays with the CFTC. This fee may be calculated in any suitable way (may also be zero). Once payment of an invoice comes due under its original terms, the buyer honors its commitment to pay the invoice and transfers an amount equal to the face value of the invoices to the financial institution. In accordance with an embodiment of the invention, the financial institution keeps this payment in full. Further payment to the CFTC service center is not required.

Reference is now made to FIG. 1B which is a schematic illustration of a computing and communications environment useful for implementing the method of FIG. 1A. In the embodiment seen in FIG. 1B, CFTC service center 10 comprises a set of computer programs and associated data structures that are operative to implement a method for collaborative financing of trade credit. CFTC service center 10 is installed, for example, on a computer platform that is communications enabled, for example by being linked to a data communications network 17 via standard communications software and communications hardware devices. In accordance with an embodiment of the invention, the computing platform carrying CFTC service center 10 is a dedicated computing device powered by a communications server system. Optionally, this platform is a general purpose computing platform including various other computing systems having diverse functionalities.

In regular operation, CFTC service center 10 is owned and operated by a business entity. The data communication network 17 may be, however, any suitable wide area computing or communications network, for example the Internet, World Wide Web (Web), or a suitable dedicated wide area network. Operation of the communications network may function automatically or manually.

As seen in FIG. 1, various suppliers, each associated with a corresponding computer device designated 14-19, maintain communication with the CFTC through network 17. The suppliers typically are business entities, such as a companies or institutions supplying products, merchandise and/or services to potential buyers in the framework of well-defined commercial transactions. These transaction typically include the provision of trade credit. In accordance with an embodiment of the invention, the CFTC 10 maintains computer records that include suppliers' respective preferences, for example agreed upon terms of operation and participation in collaborative trade credit financing operation. It is noted that these terms of operation may be configured and updated through via the communications network 17, or, alternatively, manually, for example by faxing the information or entering the information by a person.

In addition to suppliers, the CFTC center 10 maintains communication with various financial institutions, for example, through communications network 17. As seen in FIG. 1B, each financial institution operates a set of computing devices 20, 22, 24, 26 respectively. A financial institution is a business entity, for example, a bank, insurance company or any other funding company that provides financial services or funds.

In accordance with an embodiment of the invention, devices 20, 22, 24, and 26 each include the local computing systems used by corresponding financial institutions. These systems include suitable computer programs and associated data structures for supporting a method for collaborative financing of trade credit.

As seen in FIG. 1B, a buyer operating a computing device 12, is also in communication with CFTC, for example via the communications network 17. A buyer is a business entity, such as a company or an institution that purchases various products, merchandise and services from suppliers. These suppliers, include, but are not necessarily limited to, the suppliers operating the devices 14, 16, 18, 19.

Device 12, associated with a buyer, typically includes one or more computer processing unites, runs various software packages and includes communication capabilities. In accordance with an embodiment of the invention, In accordance with and embodiment of the invention, the buyer's local computing systems, including appropriate computer programs and associated data structures, run on device 12.

It is noted that for the sake of simplicity and teaching of the core inventive concepts of embodiments of the present invention only a limited number of suppliers, financial institutions, a CFTC service center and one buyer are seen in FIG. 1B. Nevertheless, in actuality a system for the collaborative financing of trade credit may include an essentially unbounded number of potential suppliers, buyers and financial institutions in communication with a CFTC service center through network 17. Optionally, a system for collaborative financing of trade credit may be operative, for example in an early start up phase, with merely a single buyer, a single supplier a single financial institution and a single CFTC service center.

In accordance with an embodiment of the invention, the CFTC service center associated with device 10 facilitates a connection between the specific financial institutions associated with each of devices 20, 22, 24, 26, the buyer associated with the device 12 and each of the suppliers associated with the devices 14,16, 18, 19. By using these connections, CFTC service center facilitates improved collaborative financing of trade credit offered by suppliers.

In accordance with an embodiment of the invention, although the provision of collaborative trade credit is facilitated and implemented by the CFTC service center 10, the process is controlled by the buyer 12 in the sense that buyer 12 controls which trade credit debts are financed and which are not.

In the embodiment seen in FIG. 1B, Buyer 12 is a business entity or other institution that maintains commercial relationships with suppliers 14, 16, 18, 19 and receives trade credit from them. Under generally accepted accounting practices, trade credit appears as "accounts payable" on the balance sheet of the buyer 12. The financial institutions 20, 22, 24, 26 are also business entities, such as banks, insurance companies, funding companies or various combinations thereof. These institutions are willing and able to assume a credit exposure against certain debts of the buyer 12 at a relatively low interest rate or risk premium when compared to market standards, or when compared to credit terms otherwise available to suppliers 14-19. In this context, the willingness of a financial institution to assume credit exposure means a readiness to provide interest bearing credit or readiness to buy a debt of the company at a certain discount.

In accordance with an embodiment of the invention, a multi-lateral contractual relationship, or several bi-lateral contractual relationships, are entered into between each the CFTC service center 10, a buyer 12, its suppliers 14, 16, 18, 19 and financial institutions 20, 22, 24, 26 who are potentially willing to provide the funds by assuming a credit exposure with buyer 12. Under terms of the contract, for goods and services delivered, each supplier 14, 16, 18, 19 agrees to receive a discounted prompt cash payment from the CFTC service center 10 in place of full future payment from a buyer under terms of trade credit.

In accordance with an embodiment of the invention, under the terms of a contractual relationship, suppliers 14, 16, 18, and 19 consent that invoices for prompt payment may be chosen by the CFTC service center 10. A suitable legal mechanism is employed with respect to the exchange of future payment with prompt discounted cash payment, for example debt assignment to CFTC service center 10. This mechanism needs to satisfy the two participants and fulfill the rules of the local legal system for the implementation of the true and final sale of the Accounts Receivable.

Consent of suppliers 14, 16, 18, 19 to the terms and to the appropriate operating procedures for the exchange of future accounts receivable for immediate discounted payment is, in effect, the equivalent of an open offer to the CFTC 10 to discount receivables of a specific buyers at certain terms. Acceptance of this offer by the CFTC 10 is indicated, for example, by a suitable notification message generated by the CFTC and sent to the appropriate supplier 14, 16, 18, and 19 concerning those invoices to be discounted. It is noted that alternatively, a supplier 14, 16, 18, and 19 may assign all the receivables in advance to the CFTC 10. Receivables that were not discounted before the payment due date, or any agreed date, would then be assigned back to the supplier.

Under the contractual arrangement, CFTC 10 consents to pay the supplier 14, 16, 18, 19 a discounted purchase price for goods or services delivered, namely face value minus a discount rate, shortly after issue of a notification message. Pursuant to the agreement, the buyer 12 is notified by the supplier regarding the assignment of the supplier's receivables and is instructed to settle selected invoices on the payment due date by paying the amount due directly to the CFTC 10 upon demand of the CFTC. The agreement with the supplier 14, 16, 18, 19 may include, for example, terms and rules that limit the invoices and the amounts that will be financed.

In accordance with an embodiment of the invention, buyer 12 consents to share his accounts payable and invoice information with the CFTC 10. In parallel, the supplier 14, 16, 18, 19 approves use of this information. Thus, whenever buyer 12 approves financing trade credit of a supplier 14, 16, 18, 19, the buyer provides a future irrevocable payment order or payment commitment to the CFTC 10. This commitment may be issued to the CFTC 10 or sent directly to that financial institution 20, 22, 24, and 26 which will be putting up short term financing covering trade credit. It is noted that such payment order neutralizes the commercial risk associated with the debt, since the buyers payment order is made irrevocable The person skilled in the art will appreciate that a buyer would make such a commitment that neutralizes the commercial risk only after verifying that he has a legal liability to pay a certain debt to the supplier based on the commercial agreement with the supplier and his satisfaction from product or services received—i.e. when the buyer cannot see any commercial risk in the specific approved debt.

In this context, commercial risk means the risk relating to the willingness of a buyer 12 to pay the debt. A commercial risk may be affected by various commercial and business considerations, for example whether an appropriate quality and quantity of merchandise is delivered. Commercial risk is different from the credit risk, which means an overall business risk associated with the buyer. Credit risk relates to the general business risk of a buyer, for example its current and future solvency.

It is a feature of the present invention, that in order to encourage collaboration of the buyer and compensate for the buyer's service to the CFTC 10, the CFTC agrees to distribute to the buyer a fee which is lower than the spread between the cost of the capital obtained based on the buyers irrevocable commitment to pay-up an invoice at a future date, and the discounted sales price paid to the supplier. In accordance with an embodiment of the invention, the CFTC's consideration may be the spread, and the buyer is paid an agreed amount in an effort to encourage its collaboration in financing the trade credit.

In accordance with the invention, a financial institution 20, 22, 24, 26 agrees to provide the CFTC 10 with a loan (credit), and preferably a non-recourse loan, against the buyer's 12 payment commitment that serves as a security for the loan. Optionally, the financial institution provides cash against the assignment (sale) of a future payment order from CFTC 10 (the accounts receivable) to the financial institution. It is appreciated that this funding may be obtained either as a secured loan, sale of a payment commitment, or combination of both. The credit line against each customer for such loans and the cost of funds may be either decided ad hoc by the financial institution, or may be the subject of a pre-negotiated arrangement.

In accordance with an embodiment of the invention, a supplier 14, 16, 18, 19 may be provided with the option of updating some of the terms and conditions of its participation in a collaborative arrangement for financing trade credit. For example, the terms may include a definition of the maximum amount of debt to be financed, the exclusion of invoices with under-minimum time period before the maturity of the buyer's 12 debt and the like. The updating of these terms will take effect within an agreed period, such as up to a few days. A supplier 14, 16, 18, or 19 may also be provided with the option to dynamically offer a discount rate over an agreed minimum discount rate, in order to give a financial incentive to the buyer 12 and CFTC 10 to select his invoices prior to selection of other suppliers' invoices.

In view of the foregoing, it is noted that in accordance with an embodiment of this invention, the CFTC service center architecture includes a computer platform with four key elements: (i) The first element comprises a set of interfaces with the participants. Through these interfaces the CFTC center communicates with the participants by receiving and sending required input and output information; (ii) The second element comprises a device to prioritize and select the transactions which will be financed. Prioritization identifies which suppliers, which invoices and which financial institutions are to be included in a potential transaction for financing trade credit. This element produces "suggestions" to the buyers, based on various rules and terms pre-set by the buyers and the suppliers, the available funds and the possible financial spreads; (iii) The third element comprises a database that stores all the information relating to transactions for financing trade credit, including the invoices of the suppliers, the instructions of the buyers, information on outstanding loans from the financial institutions and all the terms with the participants; and (iv) The forth element comprises a clearing mechanism to ensure that all the accounts are balanced and that all transactions are completed back-to-back with credit from financial institutions on one side and discounting the suppliers on the other. The priorities and selections made by the second element are sent to the buyers or shown to them on a display device.

Figure 2:
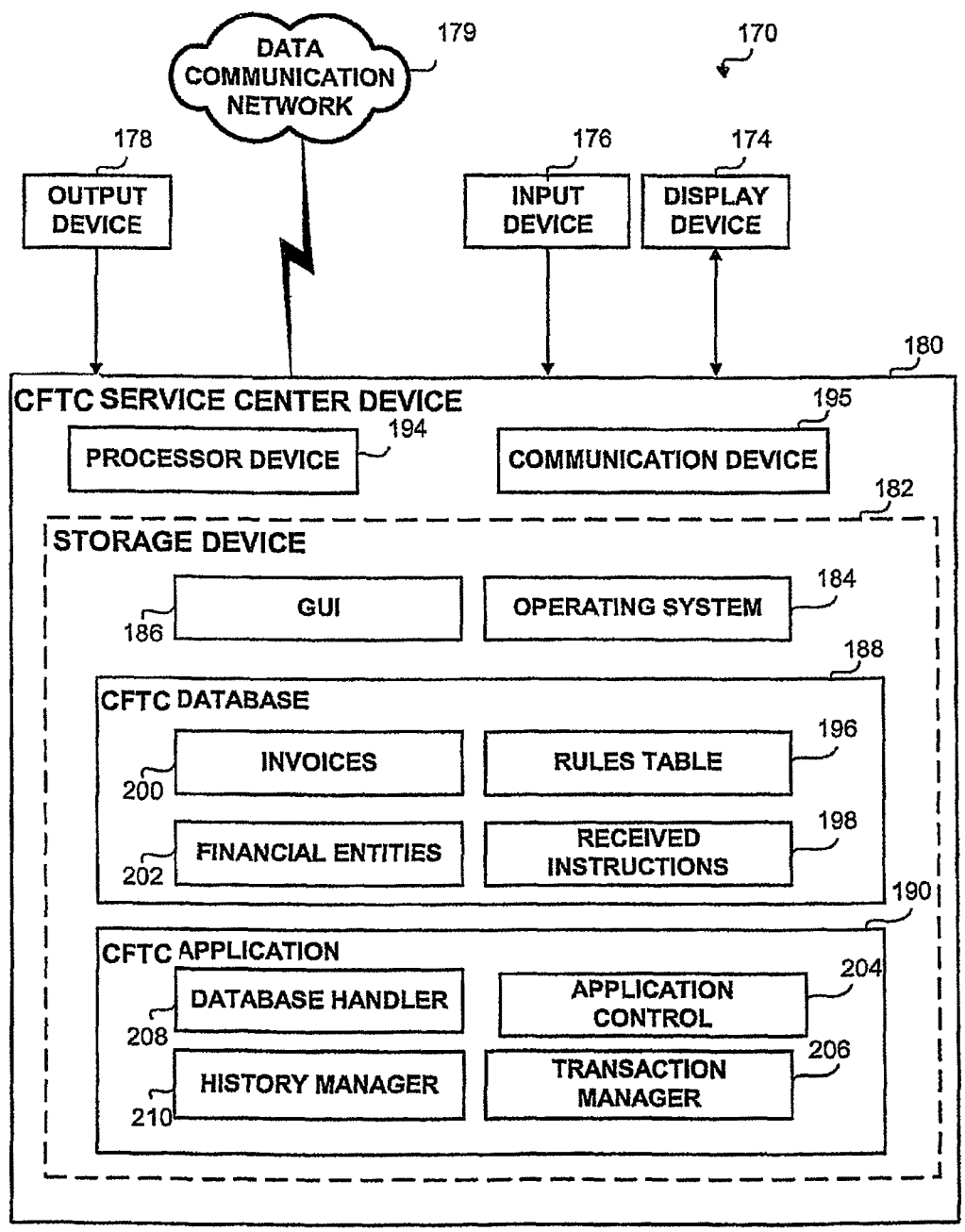
FIG. 2 is a simplified schematic illustration of an exemplary structure of a CFTC service center device, employed in the method of FIG. 1A.

Reference is now made to FIG. 2, which is a simplified schematic illustration of an exemplary structure of a CFTC service center device in accordance with an embodiment of the invention, for example a CFTC employed in the methodology seen in FIGS. 1A and 1B. CFTC service center device 170 is a computing and operational platform having communications capabilities. The device 170 includes a display device 174, an input device 176, an output device 178, a processor device 194, a communication device 195 and a storage device 182. The storage device 182 is preferably a hard disk with a sufficient storage capacity for holding computer program utilities, the applications programs and data structures needed for the operation of the methodology described with reference to FIGS. 1A and 1B.

As seen in FIG. 2, storage device 182 includes an operating system 184, a Graphical User Interface (GUI) device 186, a CFTC database 188 and a CFTC application 190. The CFTC database 188 comprises a processed invoices file 200, a rules table 196, a financial entities file 202 and a received instructions file 198. The CFTC application comprises a CFTC database handler 208, an application control routine 204, a history manager component 210 and a transaction manager component 206. The storage device may be operative to store various other data structures and applications that support the CFTC system and method. It would be easily understood that the structure, hardware devices, data structures and computer programs seen in FIG. 2 are exemplary only. Diverse other devices may be connected to and installed in the CFTC device 180 and diverse other data structures and programs may be added. In addition some of the files and programs may be combined or eliminated altogether. The person skilled in the art will appreciate that the illustration of the device 170 is merely exemplary and that like components may be employed without departing from the spirit of the invention.

In accordance with an embodiment of the invention, the communication device 195 is an apparatus that can communicate with computer systems of buyers, suppliers and financial institutions. When communicating with buyers' computer systems, the data transfer is through an adapter that is specific to the Enterprise Resource Planning system of the buyer. The adapter is designed to allow secure communication control over the transferred data to the buyer and to submit and receive information from the regular payment process in the payables systems of the buyer. When communicating with suppliers' computer systems the communication device transfer information as data or text in an agreed format that may be different from one supplier to another. This data can update the supplier's system information about the coming transaction (invoices to be paid) and during the transaction with the costs and paid invoices. When communicating with financial institutions, the communicating device may receive real-time information on prices of related financing from multiple financial institutions systems and submit information about the debt and payment order from the buyer. The communication device can send and receive information in multiple formats and multiple channels including EDI, secure emails, P2P, FTP and faxes.

In accordance with an embodiment of the invention, a Graphical User Interface (GUI) device 186 allows the user control over the process, to override specific algorithms and present historic information. The GUI may be extended to present real-time transaction information to buyers and financial institutions, for ex. it may allow financial institutions to compete in form of auction on specific financing transaction.

In accordance with an embodiment of the invention, the application control routine 204 includes algorithms that decides which invoices to pay and prioritizes suppliers according to prices and the duration the buyer's debt to the suppliers. The input may include some or all of the following: invoice information from the buyers systems, backlog information, inventory from the suppliers, availability and cost of funds, rules table 196 suppliers' preferences and discount price with each supplier. The algorithm allows a manual override by the user.

In accordance with an embodiment of the invention, the transaction manager component 206 generates payment instructions to the suppliers (the payment instructions are sent to a bank or to an automated clearing house ACH) and generates reports and the data files that update the computer systems of the suppliers and the buyers. The transaction manager also updates the database tables with all the transaction information that is stored as a log.

Figure 3:
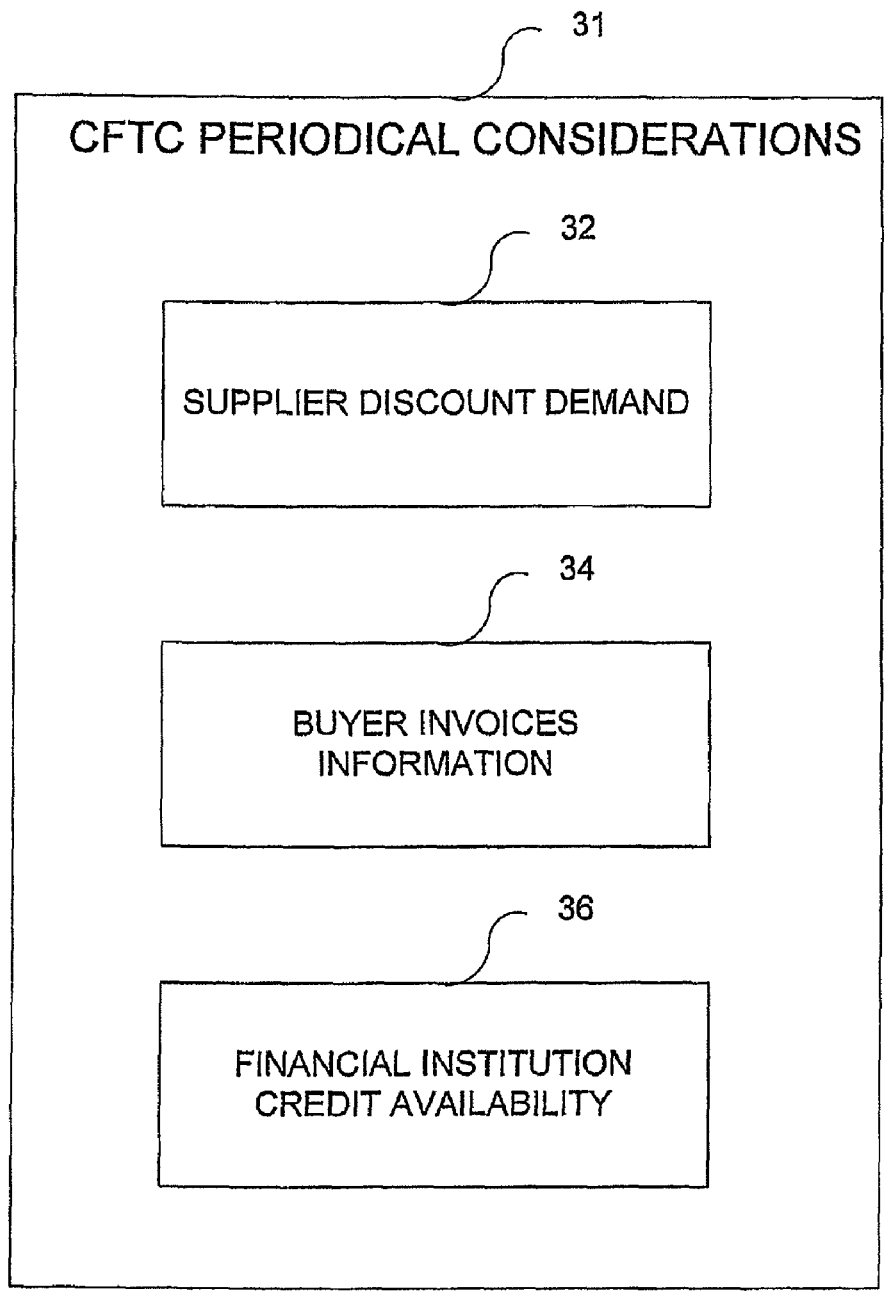
FIG. 3 is simplified chart of considerations used by a CFTC service center, in accordance with the method of FIG. 1A.

Reference is now made to FIG. 3, which is simplified chart of considerations used by a CFTC service center, in accordance with the method of FIG. 1A. The considerations included FIG. 3 are those considerations that typically considered by a buyer in selecting trade credit to be covered by collaborative financing. These considerations typically are considered at pre-defined time intervals, for example every period spanning between one and several days. In accordance with an embodiment of the invention, considerations 31 are specifically designed and developed as part of computer logic for implementation in computer programming code sequences in a CFTC application. The application is executed and runs on the CFTC service center device 10 of FIG. 1B. Considerations 31 may be considered by individuals making or using the present invention. Other considerations, similar to considerations 31, may be considered partly by computer devices and partly by individuals or commercial firms.

Considerations 31 include: suppliers demand for financing 32, and the discount rate that they are willing to accept. Terms with the suppliers are set in an agreement. Nevertheless, these terms that may change over time. Changes are transmitted as messages from the suppliers devices (reference numerals 14-19 in FIG. 1B) via the data communications network or in any other suitable way. Messages may also be received via facsimile or telephone devices or like devices.

Buyer invoice information 34, which correlates to information concerning invoices received and approved-for-payment is obtained remotely from the buyer (device 12 in FIG. 1B). In accordance with an embodiment of the invention, the information is obtained directly by accessing an accounts payable system of the buyer, or in any other alternative manner, such as by file transfer, by telephone, by facsimile message or any other suitable means. The invoices' information is received near in time to the transaction.

Through consideration 36, CFTC becomes informed of the credit exposure that each financial institution makes available to each buyer for any given period of time (of financing) and for each currency. Information necessary to make each transaction, including credit lines, is received from financial institutions 20-26 (FIG. 1B). A Request for information may be embedded into specific message files transmitted from the CFTC device 10 to the financial institutions devices via the data communication network 17 or sent to and from the bank via other means such as a telephone request or a facsimile message or like other means of communication.

Subsequent to the collection and collation of the relevant data from the suppliers, buyers and financial institutions, the information is processed by a specifically designed and developed set of computer programs that are implemented on the CFTC service center device 10 of FIG. 1B. The processing may include the prioritization of the suppliers and the financial institutions according to the financial spread, the volumes of the funds available from the financial institutions, the suppliers' demand and discount rates and the strategic and other preferences of the buyer. The financial spread is the difference between each supplier's discount rate and each financial institution per buyer interest rate, i.e. between the price the supplier is ready to pay for cash in exchange to the buyer's debt and the buyer's cost of funds at the specific financial institution. The financial income from the financing transaction is affected by the financial spread, the volume of the requested credit and the period of time. Thus, prioritization of the suppliers is important when the supply of funds by the financial institutions is less than the funds demand by the suppliers or when a buyer is not interested in using all of the funds available from the financial institutions for that purpose. The prioritization of the financial institutions is important for the same reasons since each financial institution may offer a different cost of funds per buyer and the lower the cost of funds the higher the financial spread. The prioritization may assist in creating competition that increases the financial spread even further: the financial institutions may compete by lowering interest rates per buyer and the suppliers may try to offer higher discount rates to achieve better position than other suppliers. The buyer's strategic considerations may include supplier preferences and financial institution preferences that are influenced by business needs of the buyer. For example, benefiting a strategic supplier by granting him a higher priority to financing sources (while compromising financial income from more profitable transactions with other suppliers), or conversely, excluding a financial institution, that offers a lower cost of funds, in order to keep the credit line in that financial institution available for the buyer's direct utilization.

Figure 4:
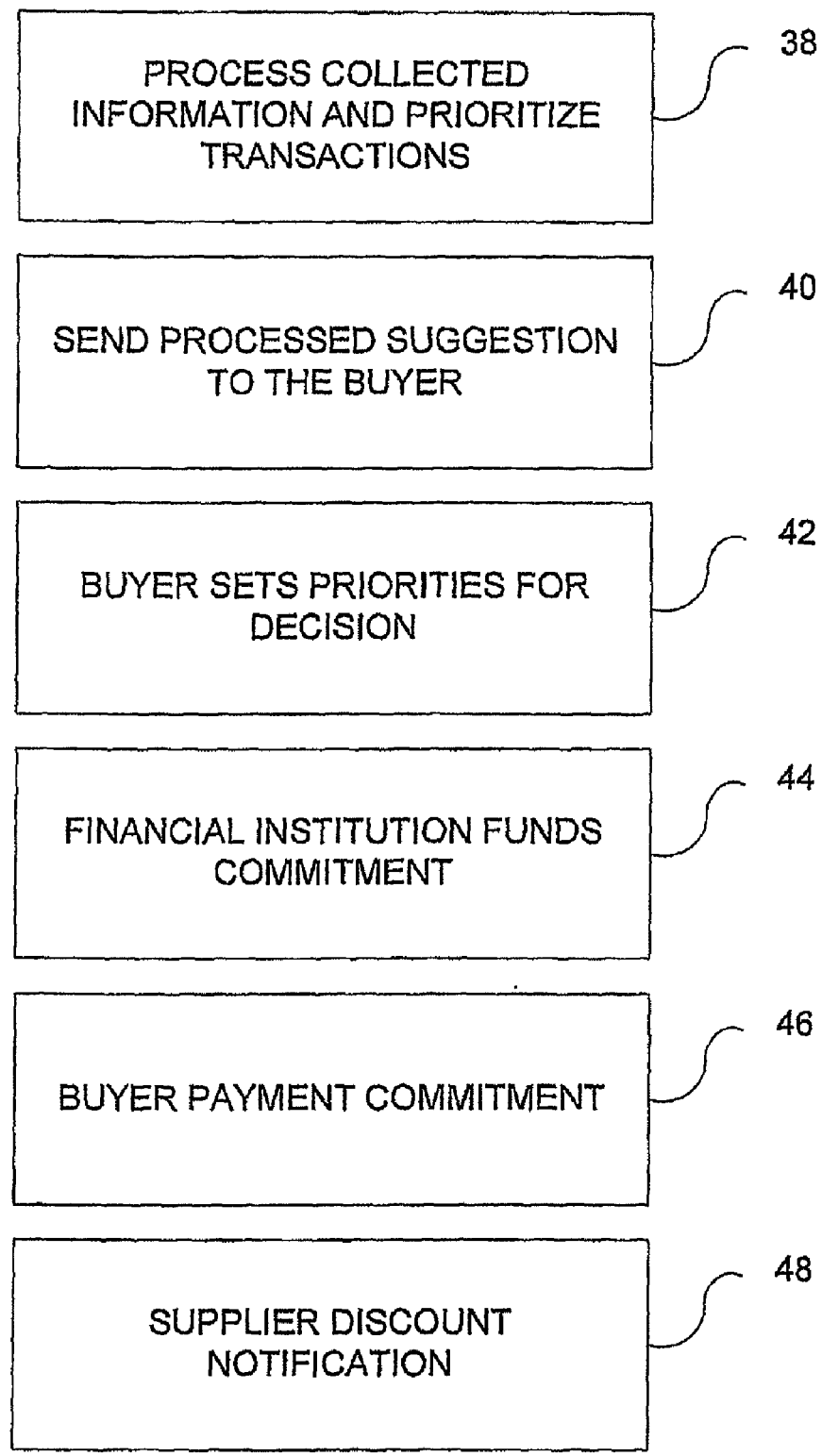
FIG. 4 is a simplified flowchart of collaborative financing of trade credit, in accordance with the method of FIG. 1A.

Reference is now made to FIG. 4 which is a simplified flowchart of a method for collaborative financing of trade credit in accordance with an embodiment of the invention. At operation 38 the information received from one or more of the suppliers, buyers and financial institutions is processed, alternative transactions are prioritized according to various criteria. These criteria include, for example, objective criteria such as the amount of a discount that a supplier is willing to accept and the cost of capital available from one or more financial institutions, as well as subjective criteria such as a buyers preferences.

At operation 40 processed and prioritized information is sent to the buyer. Information sent to the buyer includes, for example, a list of suggested invoices to be paid, and may also include the identity of financial institutions that have been selected to provide the funds for financing the trade credit, and the terms for financing. In accordance with an embodiment of the invention, the prioritized information is transmitted to the buyer via communications network 17 (FIG. 1B), or via any other suitable pathway.

At operation 42, the buyer reviews the information and the suggestion, and based on subjective financial and strategic parameters, a decision making organ of the buyer, for example its treasury or accounts department, reviews, optionally modifies and accepts the suggestion of the CFTC service center. Any accepted suggestion, as modified (if modified) are then returned to the CFTC service center.

It is appreciated that the buyer may reserve the capability of examining which invoices are to be paid to which supplier under terms of financed trade credit. Thus the buyer may further exclude specific invoices or suppliers, if desired. In accordance with an embodiment of the invention, following the approval of invoices by the buyer, information on invoices to be discounted is re-examined by the CFTC service center, tested for errors and validated against the suppliers' terms and available credit lines.

In accordance with an embodiment of the invention, at operation 42 the CFTC service center contacts selected financial institutions and confirms their final commitment to put up funds against a future payment order or against a payment order from the buyer to the CFTC, that will be sent to them in due course. This ensures that commitments requested prior to sending the actual payment order haven't changed during the time it took the buyer to approve the CFTC suggestion. In accordance with an embodiment of the invention, financial institutions may provide a time-limited commitment to supply credit, instead of confirming credit on an ad hoc basis.

In the event that an ongoing commitment from a financial institution is received at an earlier stage, the previous operation may be omitted. At operation 46 the buyer transfers a future irrevocable payment order to the selected financial institution. This transfer may be made directly to the financial institution or via the CFTC service center. In accordance with an embodiment of the invention, the payment order includes an irrevocable commitment to pay the full face value of a sales transaction on the due date of an invoice that has been approved for payment. The payment commitment may reflect a single transaction, or optionally may be a total commitment with respect to multiple sales and multiple debts to a supplier. Payment commitments may be separated according to due dates and/or different fund sources (financial institutions).

The CFTC device maintains a record of payment orders that are sent to financial institutions. At the appropriate time, at operation 48, the CFTC sends a notification message to the supplier. This message includes a list of invoices which are being paid promptly. It is appreciated that delivery of this notification message to the supplier may be made either before or after receipt of the payment order by the financial institution.

In accordance with an embodiment of this invention, the buyer may provide commitments to pay the CFTC, rather than issue payment orders in favor of financial institutions. This mechanism is effective for serving financial institution which lack the capability of handling future payment orders, and serves buyers who do not wish to instruct financial institutions to pay ahead of time. Moreover, such arrangement will also enable buyers to transfer payment between accounts in different financial institutions when the financing institution is not an institution whereat the buyer maintains a bank account. It is additionally noted that payment commitments are optionally assignable to third parties. Assignment of payment commitments enables a CFTC service center to sell the payment order/commitment with the accounts receivable and treat it as an asset.

Figure 5:
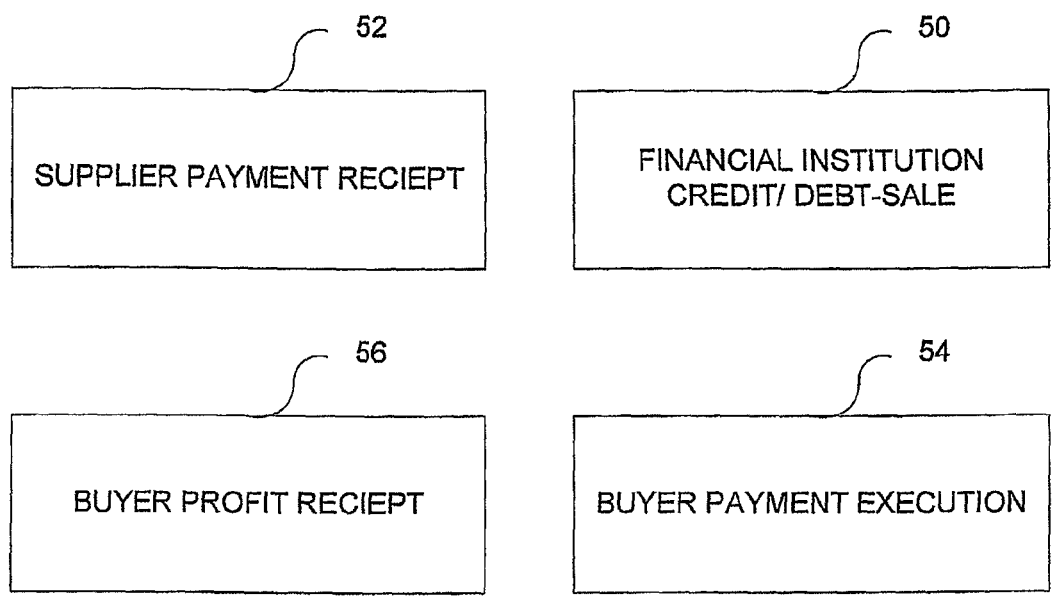
FIG. 5 is a simplified chart of procedures for completing collaborative financing of trade credit in accordance with the method of FIG. 1A.

Reference is now made to FIG. 5 which is a simplified chart of procedures for completing collaborative financing of trade credit in accordance with an embodiment of the invention. After a payment order/commitment is forwarded to a financial institution, the CFTC service center receives funds from the financial institution via any of two alternative methods, or a combination thereof:

Option 1: the CFTC receives a loan (credit) future value at maturity (namely the capital and interest due) will be equal to the amount due from the buyer to the CFTC or the financial institution under terms of the payment order. The CFTC produces and sends the financial institution a message, including permission to use the expected payment of the buyer for the repaying the loan. In accordance with an embodiment or the present invention, the loan comprises a non-recourse loan that leaves the CFTC with no credit risk.

Option 2: the buyer's payment order is assignable. Here the CFTC may sell a payment order (accounts receivable), for example as commercial paper, for cash and assign the commitment to the financial institution at a discount. This discount typically is in place of an interest rate mentioned in the associated option (1), and represents the cost of obtaining capital from the financial institution. At the payment due date, the amount owed under the payment commitment is paid by the buyer directly to the financial institution.

The economic consequences of both of options (1) and (2) are substantially similar. In both cases the financial institution assumes a credit exposure against the buyer and receives payment at an interest rate reflecting the buyer's cost of funds (operation 50). The supplier receives a discounted payment immediately or shortly after the CFTC receives funds from the financial institution (operation 52). Upon receiving the discounted payment, the supplier considers the sales transaction to be settled and it relinquishes any claims he may have against the CFTC. Distribution of funds to the supplier may be done via a trust company bank account or through a specific company that has been created for the purpose of transferring funds. In accordance with an embodiment of the invention, the trust company distances the supplier from risks assumed by the CFTC and ensures the payment to the supplier, even in the event that the CFTC becomes unable to pay in the short time from when funds are received from the financial institutions and forwarding of those funds to the supplier.

Optionally, the CFTC's activity is insured to protect the suppliers against fraud or insolvency of the CFTC. On the due date for payment, the buyer transfers funds to the financial institution. Alternatively the financial institution may charge the buyer directly in the event that the buyer has an active account with the financial institution (Operation 54). If the payment was assigned (namely, accounts receivable sold to the financial institution) the funds go directly to an account controlled by the financial institution. Otherwise when the funds are provided under credit terms, the financial institution will charge the CFTC account following payment as a payback for the loan.

In operation 56, the CFTC completes the collaborative financing of trade credit process by periodically distributing to a buyer an amount lower than the spread between funds received from financial institutions and discounted amounts. The size of the commission may be a percentage of the difference or may be calculated in any pre-negotiated manner.

In accordance with an embodiment of the present invention the commission to the buyer depends on the financial profit from the transaction. This profit is a function of the volume of the approved-for-payment invoices in buyers' respective accounts payable systems, and the period of time between approval of invoices and their respective payment due dates. This dependence incentivizes buyers to quickly approve invoices. Thus, quicker approval of the invoices results in longer a financing period, increased benefits to the supplier because it receives financing for trade credit at an earlier date, increased income to the buyer (and to the financial institutions) and correspondingly in improved economic value in the process.

It is appreciated that the entity and the role of financial institution in accordance with an embodiment of this invention may be filled by a bank, an insurance company or any other funding company. Moreover, the entity and the role of financial institution may also be filled by greater than one institution. For example, the financial institutions may include a combination of an insurance company to cover risks associated with advancing credit, and a bank to provide risk-free funds (with the the insurance company assuming credit risk instead of that of the buyer). The financial institution may also be a company that obtains funds from capital markets by selling commercial papers and other instruments.

In accordance with an embodiment of the invention, the CFTC is an independent business entity. Optionally, the CFTC is itself a financial institution that facilitates the process, although the CFTC being a financial institution may create potential conflicts of interests with other financial institutions participating exclusively as financial institutions and not as CFTCs. In accordance with another option, the CFTC may be a government-based or a not-for-profit organization. The interest of not-for-profit organization to serve as CFTCs may be to increase the efficiency of the local commerce.

An economic rationale underlying operation of embodiments of the present invention, is to enable a buyer to exploit information on approved invoices, and to use its own financial strength and the willingness of financial institutions to take credit exposure against him for generating new sources of financial income. A buyer creates new income while gaining a tool to benefit his suppliers who are short of cash or looking for additional sources of funds.

It is appreciated that suppliers may also have the benefit of an improvement in their balance sheet because non-recourse financing enables them to clear the paid accounts receivable from their balance sheet. Thus new economic value created by implementation of an embodiment of the present invention is shared by all the participants of the process: The buyer receives new income, and reduces the effective cost of a purchase transaction, while preserving the original trade credit terms with his suppliers. The supplier gains a new cash source for early payment and reduces its commercial risks. The financial institutions gaining a new channel for providing high quality credit. The CFTC service center receives a benefit, which is a part of the value created to all the other participants. Furthermore, the mutual benefits to the buyer and to the suppliers eventually increase the overall value of the commercial relationships.

It is noted that the buyer maintains total control over the process by setting the criteria for selecting sources of financing and determining the invoices with respect to which the funds are used. This too increases the economic value for the buyer, offering the buyer an additional avenue for cultivating commercial relations with preferential suppliers.

It is noted that embodiments of the invention described hereinabove are exemplary only. Although in accordance with an embodiment of the invention, collaborative financing of trade credit is performed using computerized channels and automated communications networks between the various participants, it is appreciated that parts of the transaction may be accomplished manually.

Other embodiments of the invention may include technological systems having different levels of integration. For example, a buyers' invoice information may be exported directly from the buyer's Accounts Payable (AP) system. Likewise, selected invoices-to-be-paid information, which include CFTC's suggestions, may be imported by a buyer's Accounts Payable system to automatically create payment orders and update the invoices as marked for payment, thus saving manual intervention.

The financial institution could also work with the CFTC in an integrative manner. For example, required information (the availability of capital and its cost) may be obtained automatically through a legacy systems via the Internet, or by utilizing EDI, or through various e-commerce applications, or through other suitable electronic means. Likewise, payment orders or commitments may be received electronically and programmed to automatically provide the CFTC with funds against payment orders. Moreover, interaction among suppliers may also be managed interactively through a supplier user-account established specifically on the CFTC service center computers.

It will be appreciated by persons skilled in the art that the present invention is not limited to what has been particularly shown and described hereinabove, and that may other implementations and variations are possible without departing from the spirit of the invention. The scope of the present invention is defined only by the claims, which follow.

What is claimed is:

1. A method for paying in a commercial transaction between a supplier and a buyer, the method comprising:
    essentially neutralizing a trade risk associated with payment for an existing commercial transaction resulting from a relationship between a buyer and a supplier for the delivery goods or services from said supplier to said buyer, said commercial transaction including credit terms permitting payment for said goods or services at a future date;
    engaging, via a computer processor, a collaborative financing of trade credit service center which includes a storage device and is linked to a communication network, which obtains capital from one or more financial institutions against a commitment of said buyer and paying outstanding supplier's invoices for the delivered goods and services at a future date after delivery from the supplier;
    paying a portion of said capital to said supplier in advance of said future date,
    honoring said commitment to pay outstanding supplier's invoices for the delivered goods and services on or about said future date; and
    distributing between said buyer and said collaborative financing of trade credit service center a difference between capital obtained from said one or more financial institutions and said portion paid to said supplier.

2. The method claimed in claim 1, wherein said essentially neutralizing a trade risk comprises issuing an irrevocable order by said buyer to pay outstanding supplier's invoices for said goods or services.

3. The method claimed in claim 2, wherein said issuing an irrevocable order comprises issuing an irrevocable order to pay outstanding supplier's invoices for said goods or services under at least one sales transaction.

4. The method claimed in claim 2, wherein said issuing an irrevocable order comprises issuing an irrevocable order to pay outstanding supplier's invoices for said goods or services under a plurality of sales transactions.

5. The method claimed in claim 1, wherein said engaging the collaborative financing of trade credit service center comprises engaging the collaborative financing of trade credit service center to obtain capital from financial institutions competing to put up capital against said commitment.

6. The method claimed in claim 1, wherein said engaging the collaborative financing of trade credit service center further comprises said buyer collaborating with said collaborative financing of trade credit service center to select invoices suitable for financing.

7. The method claimed in claim 5, wherein a financial institution is selected to put-up capital at least partly on the basis of a cost of said capital.

8. The method claimed in claim 1, wherein said paying a portion of said capital comprises said supplier paying a portion of a sales price for a given sale of goods or services, said portion reflecting a discount offered by said supplier in consideration of early payment for said given sale.

9. The method claimed in claim 8, wherein said portion of a sales price is less than an amount of capital obtained from a financial institution with respect to said given sale.

10. The method claimed in claim 1, wherein said honoring comprises paying up said commitment directly to said one or more financial institutions.

11. The method claimed in claim 1, wherein said honoring comprises paying up said commitment to said collaborative financing of trade credit service center, and said collaborative financing of trade credit service center paying said one or more financial institutions.

12. The method claimed in claim 1, wherein said distributing comprises distributing to a buyer an entire spread between capital obtained from said one or more financial institutions with respect to a sale, and a portion paid to said supplier with respect to said sale, and further comprising paying a commission to said collaborative financing of trade credit service center out of said spread.

13. The method claimed in claim 1, wherein said distributing comprises distributing to said collaborative financing of trade credit service center an entire spread between capital obtained from said one or more financial institutions with respect to a sale, and a portion paid to said supplier with respect to said sale, and further comprising paying to said buyer an agreed to fee in consideration of said buyer's collaboration.

14. A method for financing an existing commercial transaction resulting from a relationship between a supplier and a buyer, comprising:
    engaging, via a computer processor, through a collaborative financing of trade credit service center including a storage device and is linked to a communication network, a buyer receiving goods or services under terms of trade credit from a supplier of goods or services, said trade credit results in paying for said goods or services at a future date, said buyer essentially neutralizing a trade risk associated with paying for said goods or services;
    engaging, through said collaborative financing of trade credit service center, a financial institution to provide capital against a commitment of said buyer and paying outstanding supplier's invoices for the delivered goods and services at a future date;
    transferring a portion of said capital to said supplier in advance of said future date, said portion satisfying consideration for the supply of said goods or services; and
    paying, through said collaborative financing of trade credit service center, to the buyer an operational fee that is lower than the difference between said capital and said portion.

15. The method claimed in claim 14, further comprising collaborating with said buyer to select invoices suitable for neutralization of said trade risk.

16. The method claimed in claim 14, wherein said neutralizing a trade risk comprises said buyer issuing an irrevocable order to pay outstanding supplier's invoices for said goods or services at a future date.

17. The method claimed in claim 16, wherein said issuing an irrevocable order comprises issuing an irrevocable order to pay outstanding supplier's invoices for said goods or services under at least one sales transaction.

18. The method claimed in claim 16, wherein said issuing an irrevocable order comprises issuing an irrevocable order to pay outstanding supplier's invoices for said goods or services under at a plurality of sales transactions.

19. The method claimed in claim 1, wherein said engaging a financial institution comprises selecting said financial institution at least partly on the basis of a cost of said capital available from said financial institution.

20. The method claimed in claim 14, wherein said transferring a portion of said capital comprises transferring to said supplier a portion of a sales price for a given sale of goods or services, said portion reflecting a discount acceptable to said supplier in consideration of early payment for said given sale.

21. The method claimed in claim 20, wherein said portion of a sales price is less than an amount of capital provided by a financial institution with respect to said given sale.

22. The method claimed in claim 12, further comprising said buyer honoring said commitment by paying up said commitment directly to said one or more financial institutions.

23. The method claimed in claim 12, further comprising said buyer honoring said commitment by paying up said commitment to said collaborative financing of trade credit service center, and said collaborative financing of trade credit service center paying said one or more financial institutions.

24. A method for financing of a trade credit, comprising:
receiving and storing information, via a computer processor, from parties participating in a trade credit financing transaction at a collaborative financing of trade credit service center which includes a storage device and is linked to a communication network;
selecting according to the information received from the parties and the buyer's preference, the finance debt and the financial sources which finance the debt;
presenting the selected debt and the corresponding accounts payable and the parties to the trade credit financing transaction to the buyer;
approving by the buyer of the selected debt and the parties to the trade credit financing transaction, and sending an ante-dated irrevocable order to pay the debt that is based on the buyer's legal liability to pay suppliers under commercial terms;
assigning, through the collaborative financing of trade credit service center, the buyer's payment to a financial institution and receiving discounted cash in return;
paying in cash to a supplier a payment approved by the buyer less a discount; and
paying the buyer the difference between the cash received from the financial institution and the cash paid to the supplier, less an agreed commission.

25. The method of claim 24 wherein the step of receiving and storing information comprises the steps of:
receiving an offer and a demand from a supplier to finance trade credit which the supplier granted to the buyer, accompanied by an assignment-of-debt notification to the buyer relating to selected debt which is approved by the buyer;
receiving information representing a financial institution credit line or commitment to purchase a debt with credit exposure to the buyer; and
receiving information from the buyer on at least one approved-for payment invoice received from the supplier.

26. The method of claim 24 wherein the step of selecting the debt to finance and the financial sources to use compromises the prioritization of debts by fixed or dynamically changing considerations of:
buyer's preferences regarding at least one supplier and/or at least one financial institution, if such preferences have been presented by the buyer;
conditions and terms with supplier;
availability of financial resources; and
the financial spread in the trade credit financing transaction.

27. The method of claim 24 further comprising the step of the buyer further introducing modifications to the selected debt of the trade credit financing transaction.

28. The method of claim 24 wherein the step of approval and sending an irrevocable payment order to the financial institution to pay funds against an invoice comprises the elimination of the commercial risk with respect to the selected debt.

29. The method of claim 24 wherein the step of selecting is performed according to the financial spread of the at least one financial institution or credit sources or terms with the at least one supplier or other constraints.

30. An apparatus for financing of a trade credit by discounting a buyer's debt to a supplier and selling the buyer's debt to a financial institution, the apparatus comprising:
a collaborative financing of trade credit service center including a computer processor, a storage device and is linked to a communications network;
said trade credit service center including an interface which interfaces with the buyer, supplier and the financial institution in order to provide information concerning invoices and terms of the trade credit financing transaction;
said trade credit service center being configured to prioritize the buyers debt or select at least one trade credit financing transaction, and based on the terms of the at least one trade credit financing transaction, suggesting to at least one buyer at least one trade credit financing transaction which results in payment of the buyers debt; and
said storage device of said trade credit service center including a database which stores information of the parties to the trade credit financing transaction preferences and includes at least one file.

31. The apparatus of claim 30 wherein the at least one file comprises information about suppliers, financial institutions, buyers, discount demands, loans, invoices and agreed terms.

32. The apparatus of claim 30 wherein said database receives imported invoice information from the buyer's accounts payable system through the file, messages or direct integration.

33. The apparatus of claim 30 wherein the prioritizing the debt to be selected comprises procedures and rules that handle at least one constraint relating to at least one buyer, at least one supplier and at least one financial institution, and procedures that evaluate financial spread of plurality of any transactions having a financial spread.

34. The apparatus of claim 30, wherein the collaborative financing of trade credit service center clears the at least one trade credit financing transaction by updating and ensuring the at least one transaction is completed with credit from the at least one financial institution while discounting the at least one supplier.

35. The apparatus of claim 30, wherein the collaborative financing of trade credit service center sends the suggested transaction to the at least one buyer whereby such a suggestion is sent to the buyer's accounts payable systems.

36. The apparatus of claim 33, wherein the collaborative financing of trade credit service center further includes a display device, an input device and an output device, a communication device for receiving and sending the information to the at least one supplier, the at least one buyer and the at least one financial institution.

37. The apparatus of claim 30 wherein the database further comprises a processed invoices file, a rules table, a financial entities file and a received instructions file.

38. A method in which a collaborative financing of trade credit service center effectuates financing trade credit by discounting a buyer's debt to the supplier, eliminating commercial risks of the debt through collaboration with at least one buyer and selling the at least one buyer's debt to a financial institution, the method comprising the steps of:

obtaining, via a computer processor, through the collaborative financing of trade credit service center having storage device and is linked to a communication network, at least one supplier demand for a trade credit financing transaction;

obtaining a credit line that at least one financial institution is providing against the buyer;

obtaining from at least one buyer at least one received and approved for payment invoice associated with the supplier;

processing the at least one supplier demand, the credit line and the at least one received and approved for payment invoice associated with the supplier wherein at least one invoice is selected for payment;

transmitting to the buyer the at least one invoice selected for payment;

receiving at least one ante-dated irrevocable payment order to the at least one financial institution in order to pay the collaborative financing of trade credit service center, on the at least one selected invoice for payment due date, the total of the face value of the at least one invoice selected for payment;

receiving funds, for the assignment of the buyer's future payment, from one financial institution at a rate that represent the buyer's credit risk;

transferring, by the collaborative financing of trade credit service center to the supplier a discounted payment for the at least one invoice selected for payment, and transferring to the buyer payment of the difference between the funds received from the financial institution and the funds paid to the supplier, less a sum that stays with the collaborative financing of trade credit service center.

39. The method of claim 38 wherein the at least one supplier and the at least one buyer and the at least one financial institution have contractual relationships with the collaborative financing of trade credit service center and the at least one supplier instructs the at least one buyer to pay the debts directly to the collaborative financing of trade credit service center upon request.

40. The method of claim 38 wherein the step of selecting invoices comprises prioritization of the invoice approved for payment according to the at least one buyer's preferences, terms with the at least one supplier, at least one financial institution supply of funds and spread of the transaction.

41. The method of claim 38 further comprises at least two financial institutions that offer discount rates against a debt of the at least one buyer that represent different fund costs per the at least one buyer and wherein the collaborative financing of trade credit service center prioritizes the at least two financial institutions as sources for funds by the discount rate and according to the at least one buyer's preferences.

42. The method of claim 38 further comprises at least one supplier dynamically offering a higher discount rate than the discount rate agreed with the collaborative financing of trade credit service center to create an incentive to the entity and the at least one buyer to prioritize a transaction with the collaborative financing of trade credit service center over transactions with other at least one supplier for a better financial spread.

43. The method of claim 38 wherein the at least one financial institution is a bank or an insurance company or a business entity or a business entity that raises funds in a capital market against debts, commercial papers or bonds bearing the payment commitment risk.

44. The method of claim 38 wherein the step of transfer to the supplier is performed by the collaborative financing of trade credit service center.

45. The method of claim 38 wherein the step of transfer to the supplier is performed by a designated third party or a trust.

46. The method of claim 17 wherein the entity for financing trade credit is a business entity or a financial institution or a non for profit or a government office.

47. The apparatus of claim 30, said apparatus further comprising a communication device which interfaces and exchanges invoice information, inventory information, and other trade related data with a buyer's computer systems in real-time, sends invoice information to suppliers and exchanges financing data with financial institutions.

48. The apparatus of claim 30, wherein the device for prioritizing or selecting the at least one trade credit financing transaction comprises an auctioning mechanism for allowing financial institutions to compete on prices.

49. The apparatus of claim 30, said apparatus further comprising a device which generates and sends payment instructions to financial institutions or to an Automatic Clearing House, and notifies suppliers and buyers on payments.

* * * * *